United States Patent
Takama et al.

(10) Patent No.: US 9,329,397 B2
(45) Date of Patent: *May 3, 2016

(54) DISPLAY APPARATUS AND LIQUID CRYSTAL BARRIER DEVICE

(71) Applicant: Japan Display Inc., Tokyo (JP)

(72) Inventors: Daisuke Takama, Kanagawa (JP); Takeo Koito, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,607

(22) Filed: Nov. 16, 2015

(65) Prior Publication Data

US 2016/0070111 A1    Mar. 10, 2016

Related U.S. Application Data

(63) Continuation of application No. 13/763,140, filed on Feb. 8, 2013, now Pat. No. 9,188,801.

(30) Foreign Application Priority Data

Mar. 2, 2012    (JP) .................................. 2012-046794

(51) Int. Cl.
   *G02F 1/1335* (2006.01)
   *G02B 27/22* (2006.01)
   *G02F 1/1333* (2006.01)
   *G02F 1/137* (2006.01)
   *G02F 1/29* (2006.01)

(52) U.S. Cl.
   CPC ............ *G02B 27/2214* (2013.01); *G02F 1/137* (2013.01); *G02F 1/133345* (2013.01); *G02F 1/29* (2013.01)

(58) Field of Classification Search
   CPC ................................................ G02F 1/133345
   See application file for complete search history.

(56) References Cited

U.S. PATENT DOCUMENTS

| 9,076,360 B2* | 7/2015 | Kim ...................... G09G 9/003 |
| 2009/0224646 A1 | 9/2009 | Kim et al. |
| 2012/0229720 A1 | 9/2012 | Lee et al. |
| 2012/0236043 A1 | 9/2012 | Jung et al. |

(Continued)

FOREIGN PATENT DOCUMENTS

| JP | 2009-053645 | 3/2009 |
| JP | 2009-217231 A | 9/2009 |

(Continued)

OTHER PUBLICATIONS

Japanese Office Action mailed Mar. 3, 2015 for corresponding Japanese Application No. 2012-046794.

*Primary Examiner* — Timothy L Rude
(74) *Attorney, Agent, or Firm* — Michael Best & Friedrich LLP

(57) ABSTRACT

A display apparatus includes: a display unit; and a liquid crystal variable barrier arranged so as to face the display unit, having plural strip-shaped first electrodes, a second electrode arranged so as to face the first electrodes and a liquid crystal layer arranged between the first electrodes and the second electrode, and separating an image displayed by the display unit into images respectively corresponding to plural viewpoints, wherein the first electrodes are arranged so that adjacent first electrodes partially overlap each other through an insulating layer, and plural first electrodes form an opening.

3 Claims, 16 Drawing Sheets

MODIFICATION EXAMPLE

(56) References Cited

U.S. PATENT DOCUMENTS

2012/0300042 A1 11/2012 Yun et al.
2014/0362314 A1 12/2014 Guo et al.

FOREIGN PATENT DOCUMENTS

| JP | 2010-113332 A | 5/2010 |
| JP | 2011-018049 A | 1/2011 |

* cited by examiner

FIG.2
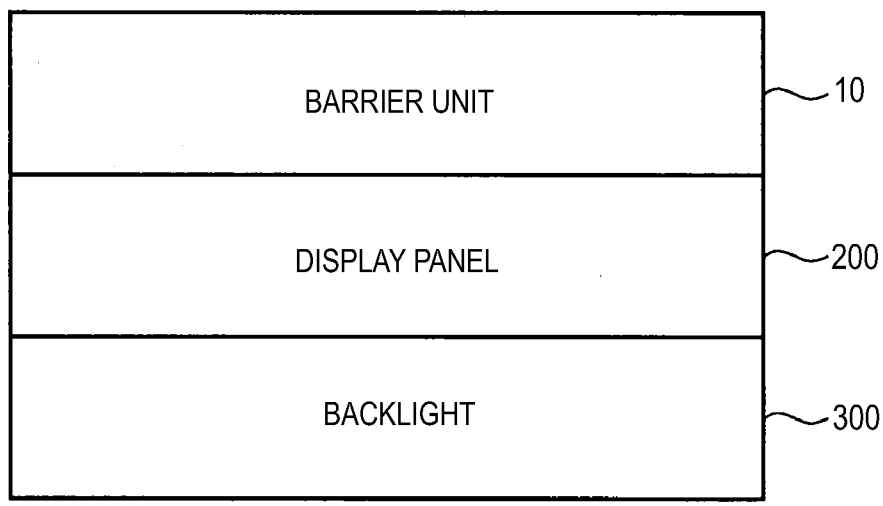
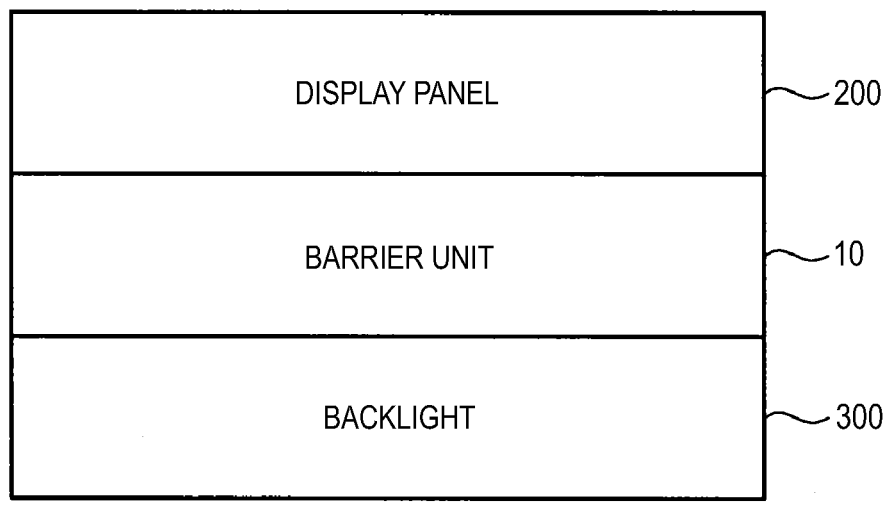

MODIFICATION EXAMPLE

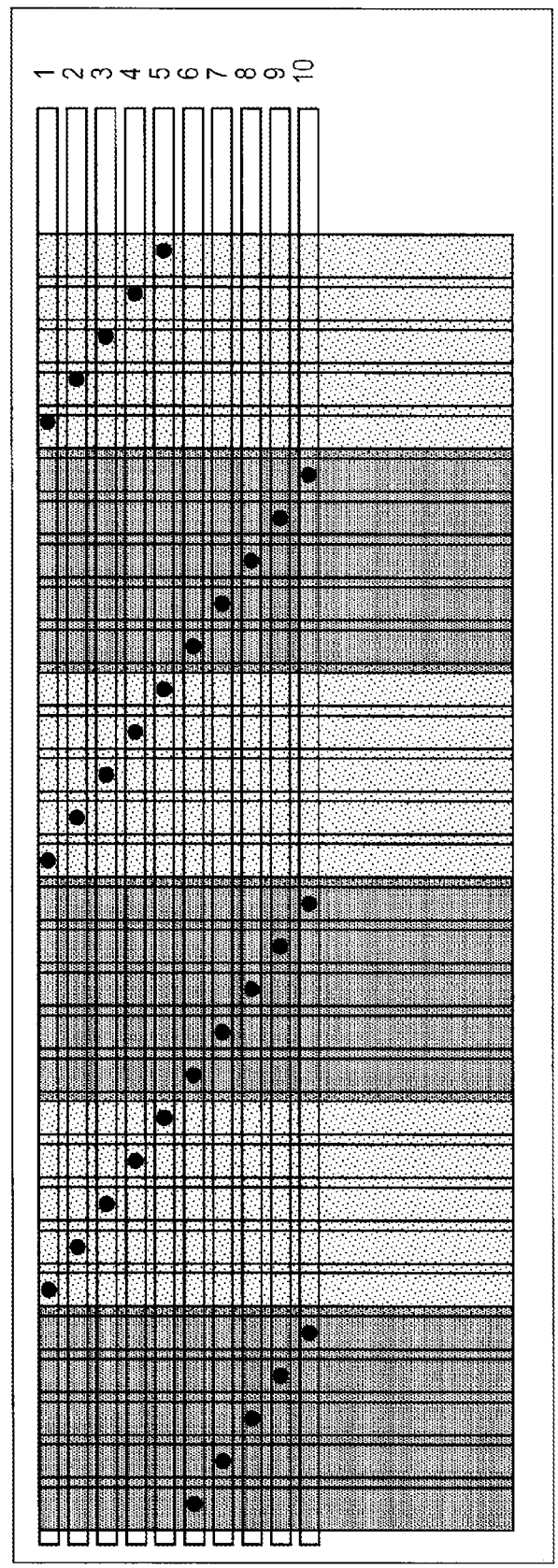

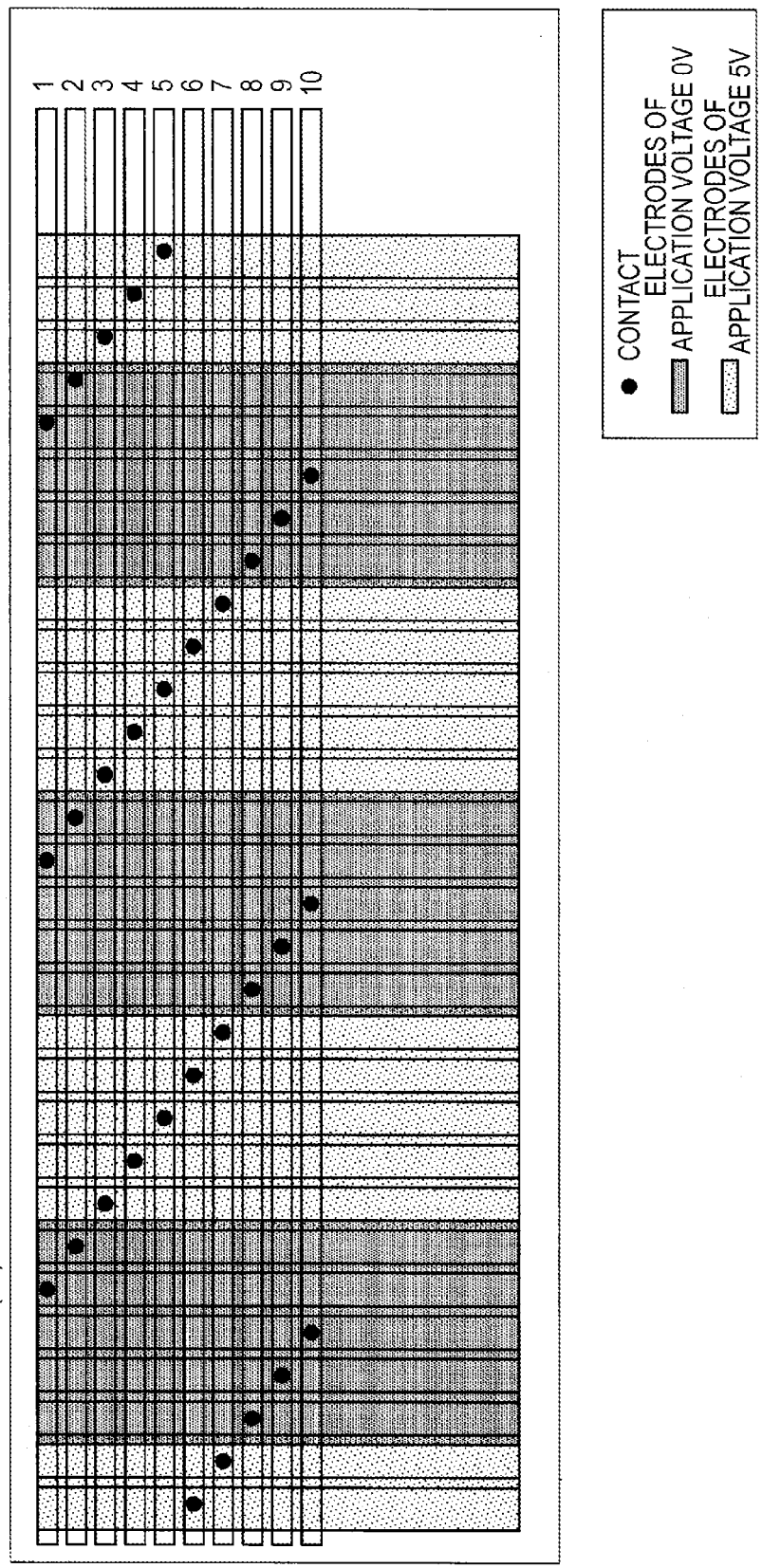

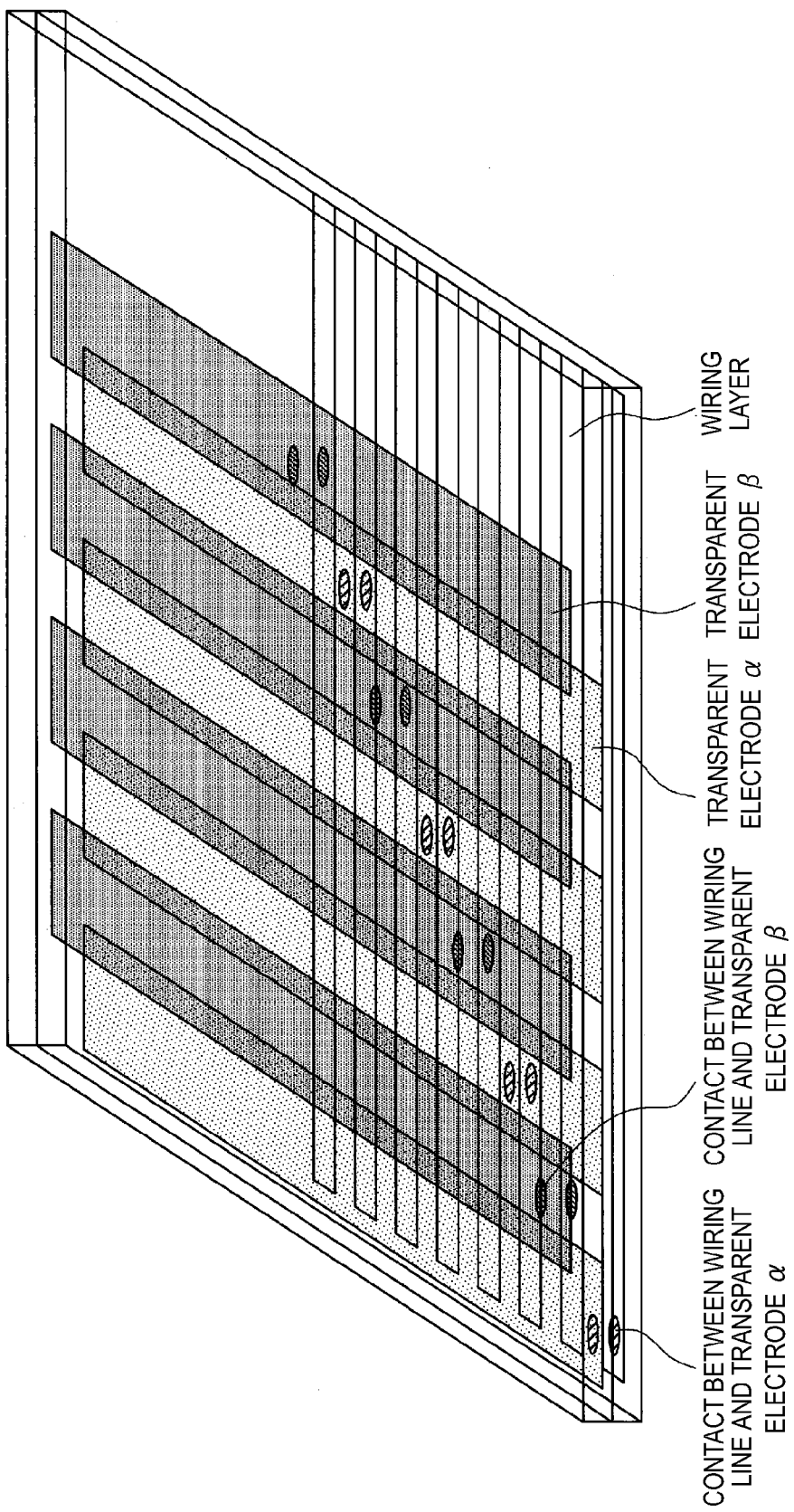

(STATE 1)
1-3,9,10:HIGH(5V)
4,5,6-8 :LOW(0V)

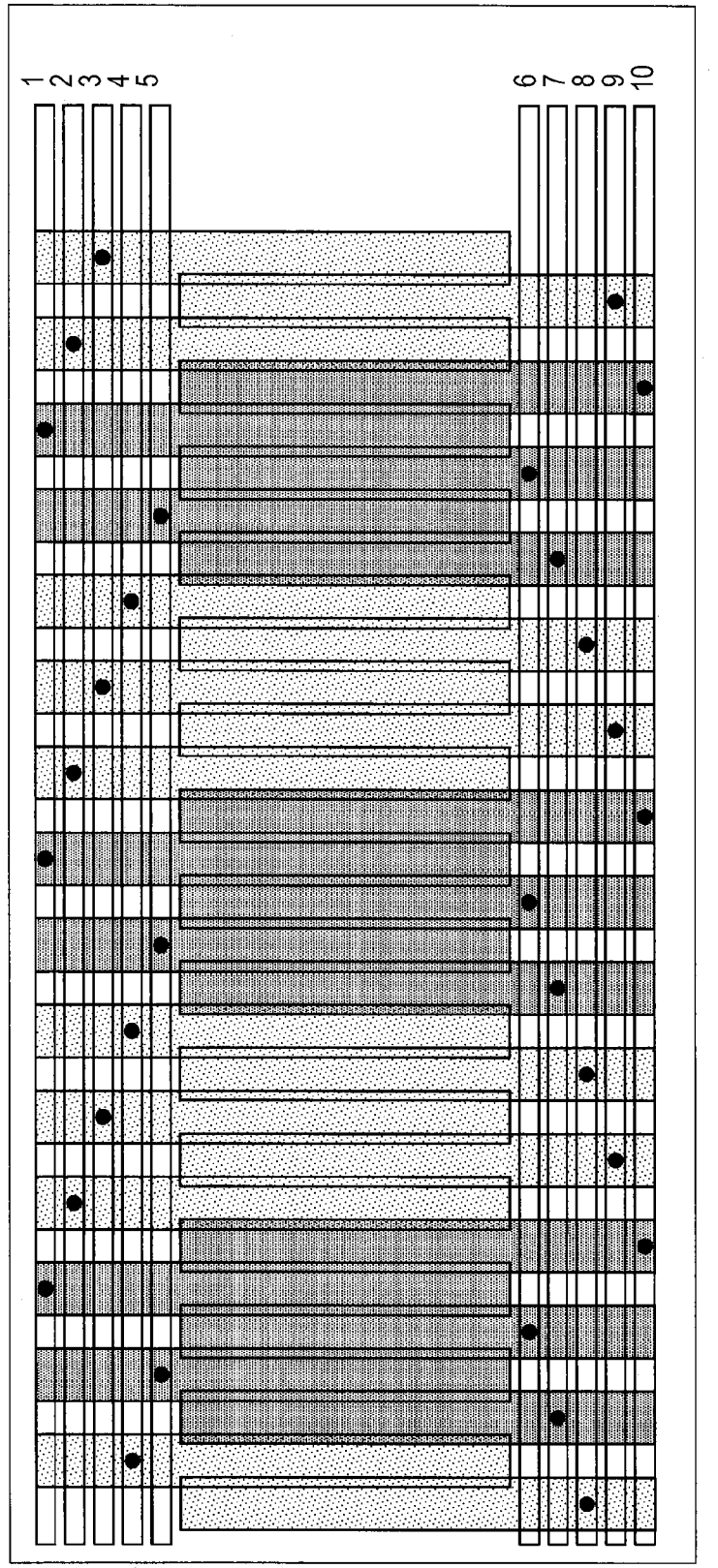

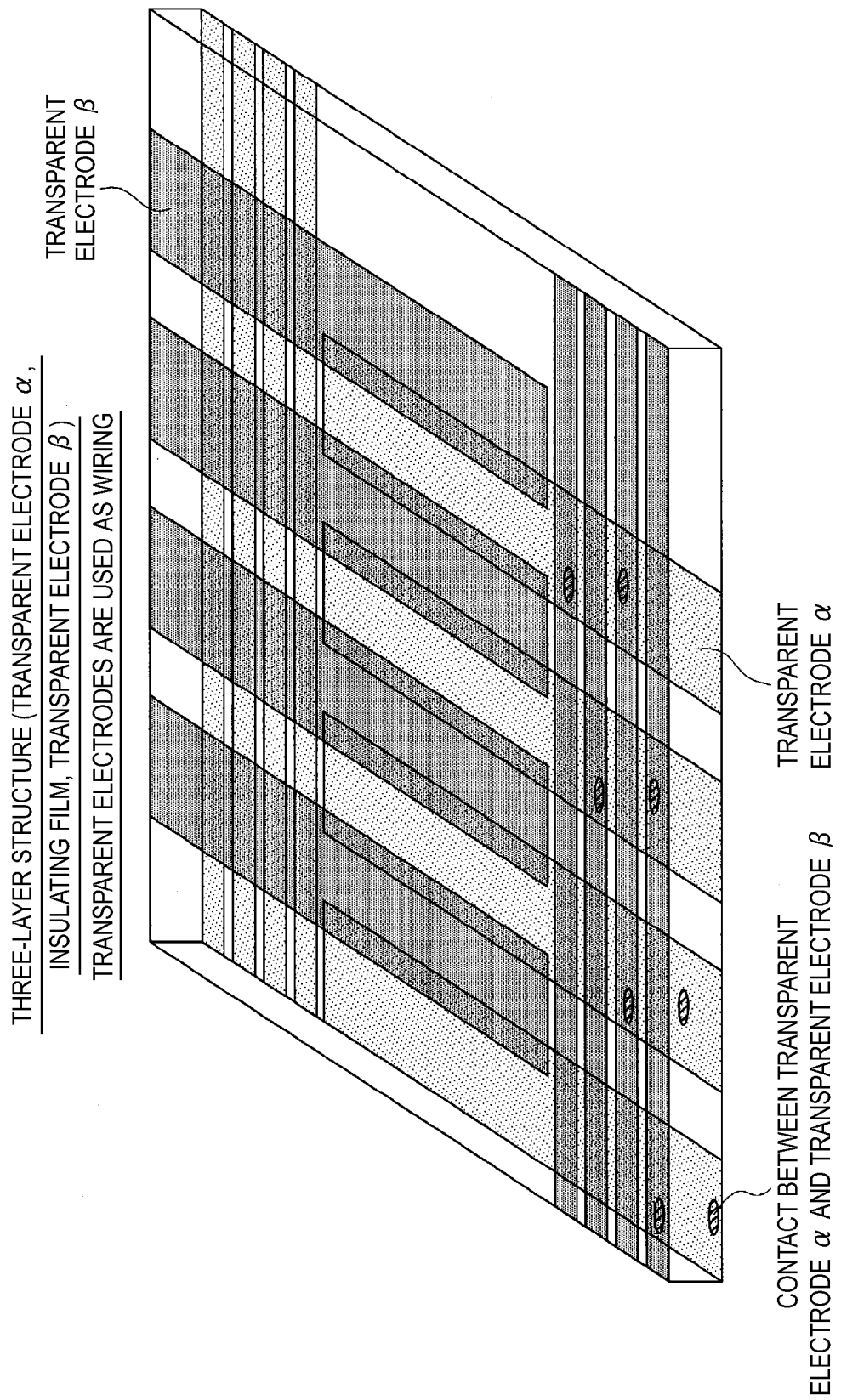

| D | 5 | μm |
| R | 3E+05 | μm |
| λ | 0.55 | μm |

D: GAP BETWEEN ELECTRODES
R: DISTANCE TO SCREEN
λ: WAVELENGTH

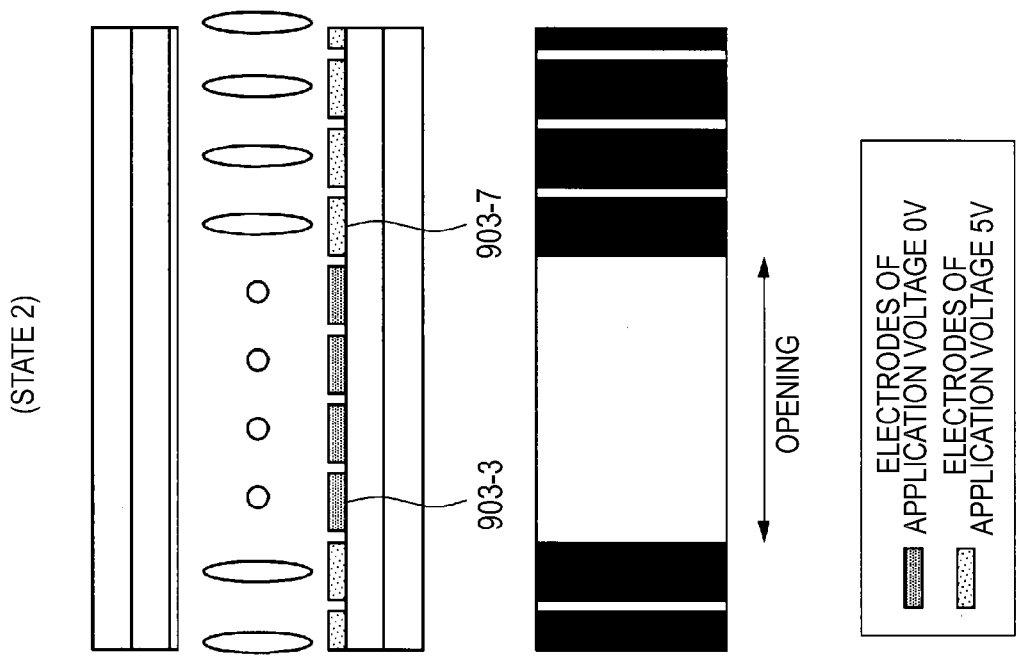
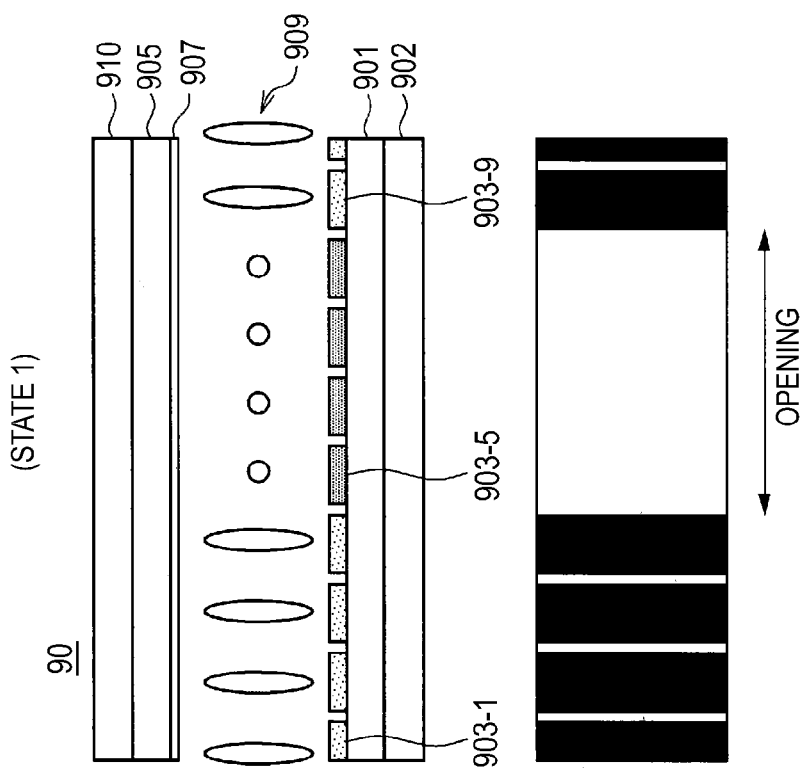
FIG. 15

DISPLAY APPARATUS AND LIQUID CRYSTAL BARRIER DEVICE

CROSS REFERENCE TO RELATED APPLICATIONS

This is a Continuation Application of the patent application Ser. No. 13/763,140, filed Feb. 8, 2013, which claims priority from Japanese Priority Patent Application JP 2012-046794 filed Mar. 2, 2012, the entire contents of which are incorporated herein by reference.

BACKGROUND

A display apparatus capable of spatially separating images corresponding to plural viewpoints by a barrier device having transmissive portions to observe different images in respective viewpoints is being developed. As an example of the barrier device used for such display apparatus, a liquid crystal barrier device can be cited. The liquid crystal barrier device has plural strip-shaped electrodes, which can change positions of the transmissive portions by controlling a voltage to be applied to the electrode.

As the voltage is not applied between electrodes in the above liquid crystal barrier device, light escape occurs from portions which are desired to be shielded, which may cause crosstalk. In response to this, there is disclosed, in JP-A-2009-53645 (Patent Document 1), a barrier device which can prevent light escape by arranging a black-colored layer at portions corresponding to between electrodes.

SUMMARY

It can be considered that plural electrodes form one transmissive portion by minutely patterning the electrodes for controlling positions of transmissive portions with high accuracy. The black-colored layer blocks light regardless of application/non-application of the voltage to the electrodes. Accordingly, it is difficult to use the black-colored layer to the structure in which plural electrodes form one transmissive portion.

In view of the above, it is desirable to provide a display device and a liquid crystal barrier device capable of preventing light escape between electrodes in the liquid crystal barrier device in which plural electrodes form one transmissive portion.

An embodiment of the present disclosure is directed to a display apparatus including a display unit, and a liquid crystal variable barrier arranged so as to face the display unit, having plural strip-shaped first electrodes, a second electrode arranged so as to face the first electrodes and a liquid crystal layer arranged between the first electrodes and the second electrode, and separating an image displayed by the display unit into images respectively corresponding to plural viewpoints, in which the first electrodes are arranged so that adjacent first electrodes partially overlap each other through an insulating layer, and plural first electrodes form an opening.

Another embodiment of the present disclosure is directed to a liquid crystal variable barrier including plural strip-shaped first electrodes, a second electrode arranged so as to face the first electrodes, and a liquid crystal layer arranged between the first electrodes and the second electrode, in which the first electrodes are arranged so that adjacent first electrodes partially overlap each other through an insulating layer, and plural first electrodes form an opening.

As described above, according to the embodiments of the present disclosure, it is possible to provide the display apparatus and the liquid crystal barrier device capable of preventing light escape between electrodes in the liquid crystal barrier device forming one transmissive portion by plural electrodes.

BRIEF DESCRIPTION OF THE DRAWINGS

FIG. 2 is an explanatory view showing system examples of forming parallax images;

FIG. 6A is an upper surface view showing an example of a five-layer structure of peripheral wiring in the barrier unit according to the embodiment;

FIG. 6B is an upper surface view showing an example of a five-layer structure of peripheral wiring in the barrier unit according to the embodiment;

FIG. 7 is a perspective view showing an example of the five-layer structure of peripheral wiring in the barrier unit according to embodiment;

FIG. 8B is an upper surface views showing an example of a three-layer structure of peripheral wiring in the barrier unit according to the embodiment;

FIG. 9 is a perspective view showing an example of the three-layer structure of peripheral wiring in the barrier unit according to embodiment;

FIG. 15 is an explanatory view showing electrode arrangement of the barrier unit as a comparative example.

DETAILED DESCRIPTION

A preferred embodiment of the present disclosure will be explained in detail with reference to attached drawings. The components having the substantially same functional structures will be denoted by the same symbols to omit repeated explanation in the present specification and the drawings.

The explanation will be made in the following order.
1. Configuration Example of Display Device
2. Structure Example of Barrier Unit 3. Peripheral Wiring Example
4. Example of Advantages

1. Configuration Example of Display Device

Figure 1:
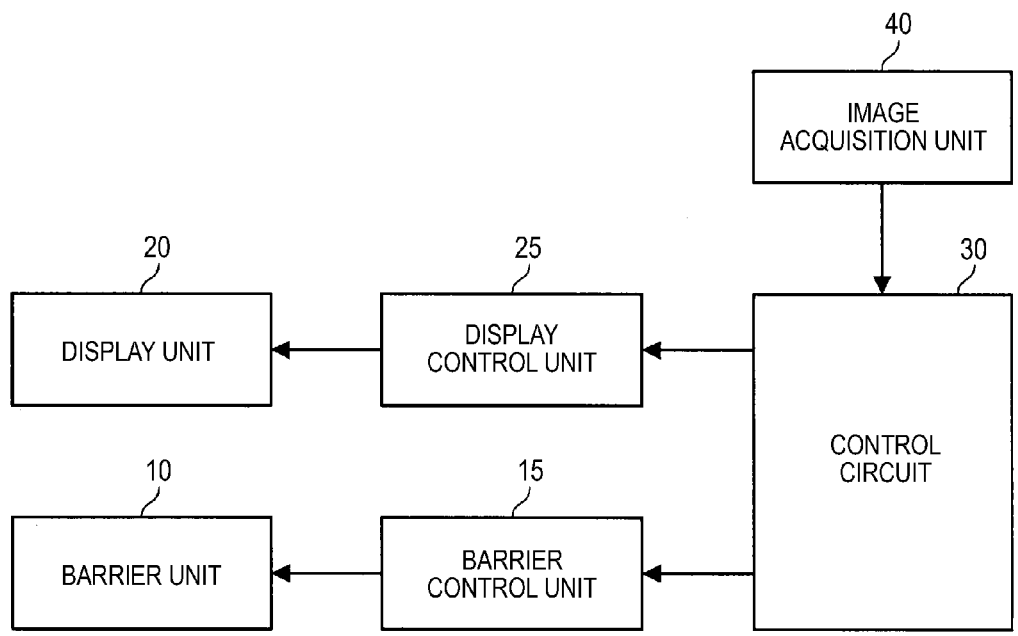
FIG. 1 is a block diagram showing a configuration example of a display device according to an embodiment of the present disclosure.

An example of a configuration of a display device according to an embodiment of the present disclosure will be explained with reference to FIG. 1 and FIG. 2. FIG. 1 is a block diagram showing a configuration example of the display device according to the embodiment of the present disclosure. FIG. 2 is an explanatory view showing system examples of forming parallax images.

A display apparatus 1000 according to the embodiment of the present disclosure mainly includes a barrier unit 10, a barrier control unit 15, a display unit 20, a display control unit 25, a control circuit 30 and an image acquisition unit 40.

The display apparatus 1000 is some kind of device in which the barrier unit 10 is superimposed on the display unit 20, which is, for example, a television, a cellular phone (smart phone), a digital camera, a personal computer, a navigation device or a game machine.

The barrier unit 10 is arranged so as to face the display unit 20. The barrier unit 10 has a function of separating an image displayed by the display unit 20 into plural viewpoint images. The barrier unit 10 is a liquid crystal barrier device controlling the voltage to be applied to electrodes to control alignment of liquid crystal molecules, thereby forming transmissive portions through which light is transmitted and blocking portions blocking light. The transmissive portions indicate portions having higher light transmittance than other portions in the barrier unit 10. The barrier unit 10 can change positions of the transmissive portions and the blocking portions by controlling the voltage to be applied to the electrodes in accordance with control by the barrier control unit 15.

The barrier control unit 15 has a function of controlling operation of the barrier unit 10. The barrier control unit 15 can control operation of the barrier unit 10 by controlling the voltage to be applied to the electrodes of the barrier unit 10 based on an instruction from the control circuit 30. The barrier control unit 15 can control positions of the transmissive portions and the blocking portions in the barrier unit 10 by controlling the voltage to be applied to the electrodes of the barrier unit 10 so as to correspond to a position of an observer who watches the display in the display unit 20.

The display unit 20 is a display device of displaying images. The display unit 20 operates in accordance with control by the display control unit 25. The display unit 20 may be, for example, a display device such as a liquid crystal display (LCD) or an organic EL display (GELD). The display unit 20 can display images for stereoscopic display.

The display control unit 25 has a function of controlling operation of the display unit 20. The display control unit 25 can control the contents to be displayed on a display screen of the display unit 20 based on an instruction from the control circuit 30.

The control circuit 30 includes, for example, a CPU (Central Processing Unit), a RAM (Random Access Memory), a ROM (Read Only Memory) and the like, controlling respective units of the display apparatus 1000. The control circuit 30 can provide the observer with 2D display images or 3D display images by controlling the barrier control unit 15 and the display control unit 25. For example, the control circuit 30 performs control so that the entire surface of the barrier unit 10 has high transmittance and so that the display unit 20 displays 2D display images, thereby providing the observer with 2D display images. The control circuit 30 performs control so that the barrier unit 10 has the transmissive portions and the blocking portions and so that the display unit 20 displays 3D display images, thereby providing the observer with 3D display images. The control circuit 30 can recognize the position of the observer based on an image acquired by the image acquisition unit 40 and can shift positions of the transmissive portions and the blocking portions of the barrier unit 10 in accordance with the position of the observer.

The image acquisition unit 40 has a function of acquiring an image for recognizing the position of the observer. For example, it is desirable that an imaging device for acquiring the image is installed at a position where the observer facing the display screen of the display unit 20 can be captured.

The barrier unit 10 and the display unit 20 may be arranged so that the barrier unit 10, a display panel 200 and a backlight 300 are sequentially stacked from the observer's side as shown in Example 1 of FIG. 2. The display unit 20 includes the display panel 200 and the backlight 300. Moreover, the arrangement of the barrier unit 10 and the display unit 20 may be arranged so that the display panel 200, the barrier unit 10 and the backlight 300 are sequentially stacked from the observer's side as shown in Example 2 of FIG. 2. The present disclosure can be applied to both types of display apparatuses.

2. Structure Example of Barrier Unit

Figure 3:
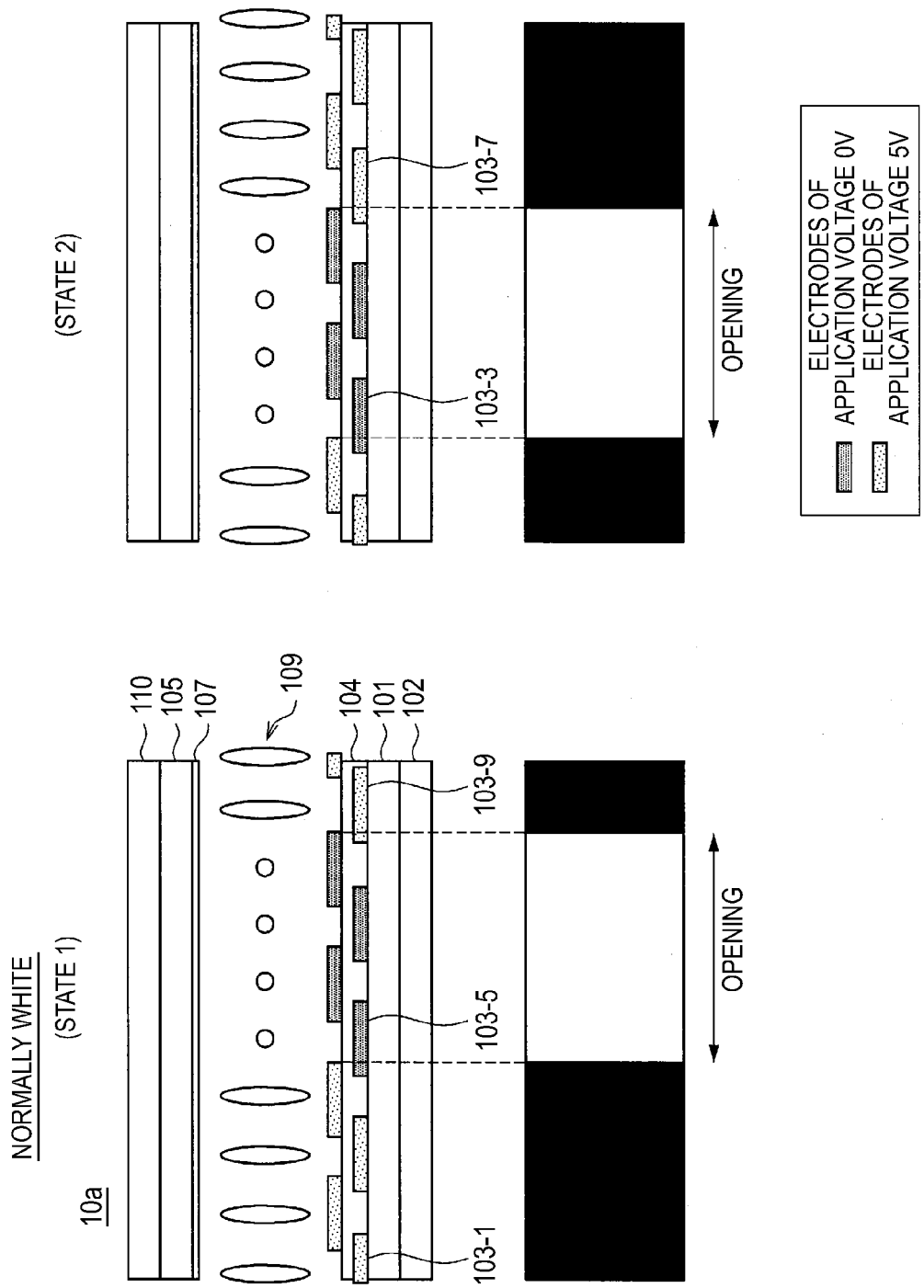
FIG. 3 is an explanatory view showing a structure of the barrier unit using liquid crystal in a normally white mode in the display apparatus according to the embodiment.
Figure 4:
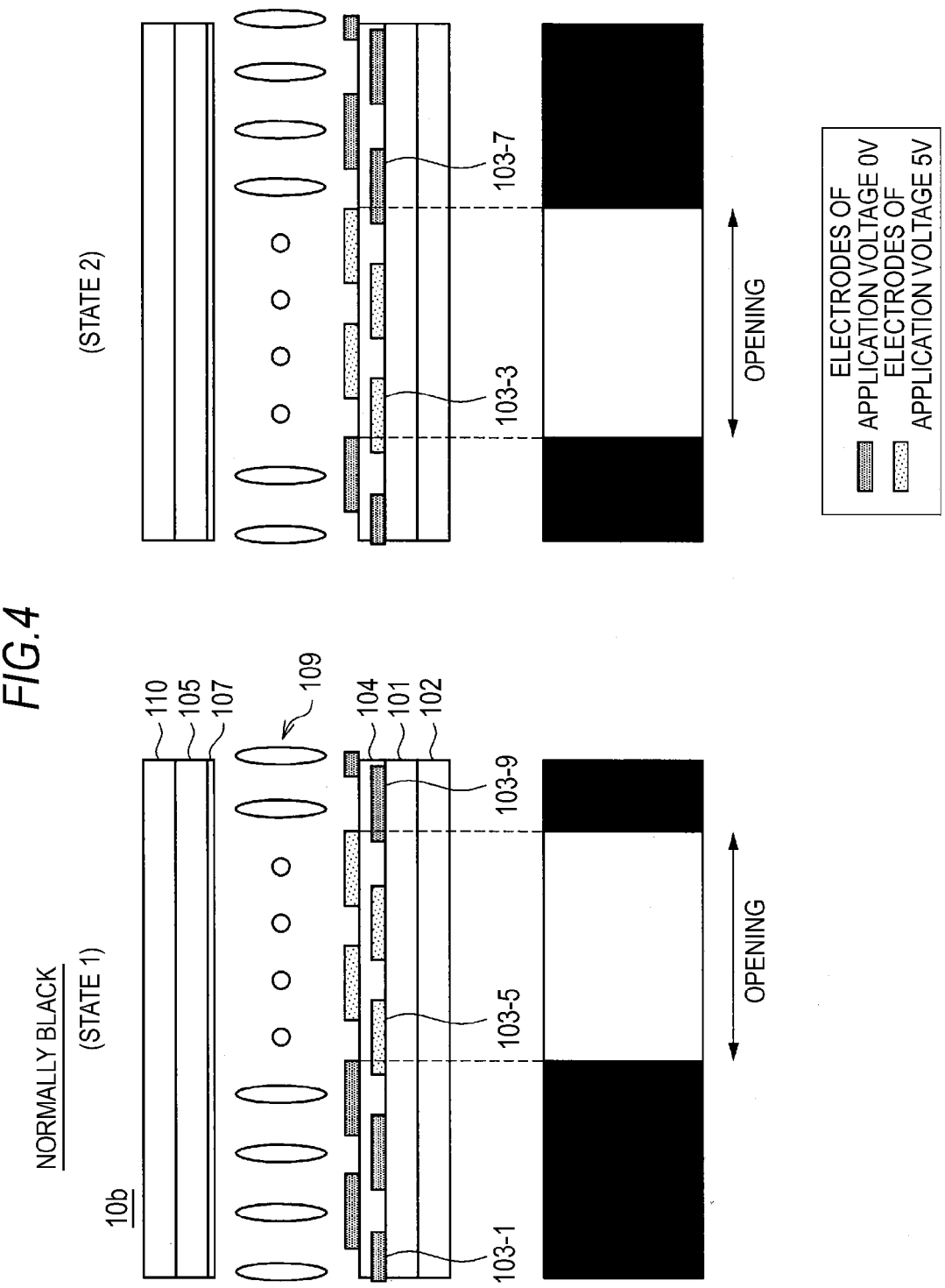
FIG. 4 is an explanatory view showing a structure of the barrier unit using liquid crystal in a normally black mode in the display apparatus according to the embodiment.
Figure 5:
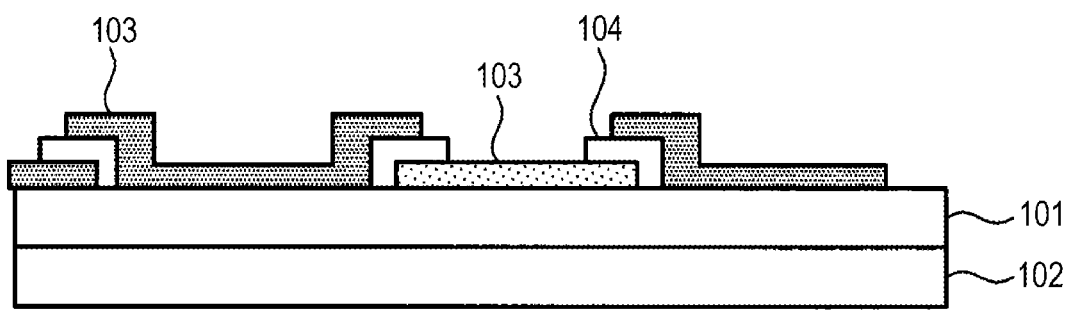
FIG. 5 is an explanatory view showing a modification example of electrode arrangement in the barrier unit of the display apparatus according to the embodiment.

Next, a structure of the barrier unit 10 in the display apparatus 1000 according to the embodiment of the present disclosure will be explained with reference to FIG. 3 to FIG. 5 as well as FIG. 15. FIG. 3 is an explanatory view showing a structure of the barrier unit using liquid crystal in a normally white mode in the display apparatus according to the embodiment. FIG. 4 is an explanatory view showing a structure of the barrier unit using liquid crystal in a normally black mode in the display apparatus according to the embodiment. FIG. 5 is an explanatory view showing a modification example of electrode arrangement in the barrier unit 10 of the display apparatus according to the embodiment. FIG. 15 is an explanatory view showing electrode arrangement of the barrier unit as a comparative example.

Referring to FIG. 3, the barrier unit 10 mainly includes a first substrate 101, a first polarizing plate 102, first electrodes 103, an insulating layer 104, a second substrate 105, a second electrode 107 and a second polarizing plate 110.

The first substrate 101 and the second substrate 105 are made of a material which is transparent with respect to visible light. The substrate 101 and the second substrate 105 may be made of, for example, a glass material. On the first substrate 101, plural strip-shaped first electrodes 103 are formed. The first electrodes 103 are arranged at intervals from one another. On the second substrate 105, the second electrode 107 is formed uniformly over approximately the entire surface. The first electrodes 103 and the second electrode 107 are conductive films which are transparent with respect to visible light. As an example of the conductive film transparent with respect to visible light, for example, an ITO (Indium Tin Oxide) film can be cited.

The liquid crystal layer 109 is formed between the first electrodes 103 and the second electrode 107. The liquid crystal layer 109 includes plural liquid crystal molecules. The alignment of the liquid crystal molecules is changed in accordance with the voltage to be applied between the first electrode 103 and the second electrode 107. The phase difference of the liquid crystal layer 109 with respect to light is changed and transmittance at the portion is changed due to the alignment. The voltage to be applied to the first electrodes 103 is individually controlled with respect to respective strip-shaped first electrodes 103. As the alignment of the liquid crystal layer 109 above the first electrodes 103 is changed, the transmittance of the liquid crystal layer 109 is switched in units of the width of the first electrodes 103. Therefore, as the first electrodes 103 are minutely patterned, positions of the transmissive portions and the blocking portions can be finely controlled. The barrier unit 10 is used for a head-tracking display apparatus in the present embodiment. When the positions of the transmissive portions and the blocking portions can be finely controlled, it is possible to follow the viewpoint position of the observer more smoothly.

Here, the first electrodes 103 are plural strip-shaped electrodes, in which adjacent first electrodes are arranged so as to partially overlap each other through the insulating layer 104. Assume that the first electrodes 103 are a first electrode 103-1, a first electrode 103-2, ... and a first electrode 103-10 from the left in FIG. 3 in a barrier unit 10a in the normally white mode. As shown in State 1 of FIG. 3, when a voltage to be applied to the first electrodes 103-1 to 103-4, the first electrode 103-9 and the first electrode 103-10 is 5V, and a voltage to be applied to the first electrodes 103-5 to 103-8 is 0V, the liquid crystal layer 109 above the first electrodes 103-1 to 103-4, the first electrode 103-9 and the first electrode 103-10 is in an alignment state with lower light transmittance, and the liquid crystal layer 109 above the first electrodes 103-5 to 103-8 is in an alignment state with higher light transmittance. Accordingly, a part corresponding to the first electrodes 103-5 to 103-8 forms an opening.

In State 2 in FIG. 3, a voltage to be applied to the first electrode 103-1, the first electrode 103-2 and the first electrodes 103-7 to 103-10 is 5V, and a voltage to be applied to the first electrodes 103-3 to 103-6 is 0V. In this case, the liquid crystal layer 109 above the first electrode 103-1, the first electrode 103-2 and the first electrodes 103-7 to 103-10 is in the alignment state with lower light transmittance, and the liquid crystal layer 109 above the first electrodes 103-3 to 103-6 is in the alignment state with higher light transmittance. Accordingly, a part corresponding to the first electrodes 103-3 to 103-6 forms an opening. In this case, the first electrodes 103 are arranged so that adjacent first electrodes 103 vertically overlap each other. As the voltage is thus applied between electrodes, light escape between electrodes can be prevented.

Here, FIG. 15 is referred to for explaining the phenomenon of light escape occurring between lower electrodes in related art. A barrier unit 90 mainly includes a first substrate 901, a first polarizing plate 902, a first electrode 903, a second substrate 905, a second electrode 907, a liquid crystal layer 909 and a second polarizing plate 910. Here, the first substrate 901, the first polarizing plate 902, the second substrate 905, the second electrode 907, the liquid crystal layer 909 and the second polarizing plate 910 which are components other than the first electrodes 903 have the same functions as the above first substrate 101, the first polarizing plate 102, the second substrate 105, the second electrode 107 and the second polarizing plate 110, therefore, explanation is omitted here.

Plural strip-shaped first electrodes 903 are arranged side by side at intervals from one another. Assume that the first electrodes 903 are a first electrode 903-1 to a first electrode 903-10 sequentially from the left in FIG. 15. For example, in State 1 of FIG. 15, a voltage to be applied to the first electrodes 903-1 to 903-4, the first electrode 903-9 and the first electrode 903-10 is 5V, and a voltage to be applied to the first electrodes 903-5 to 903-8 is 0V. In this case, the liquid crystal layer 909 above the first electrodes 903-1 to 903-4, the first electrode 903-9 and the first electrode 903-10 is in the alignment state with lower light transmittance, and the liquid crystal layer 909 above the first electrodes 903-5 to 903-8 is in the alignment state with higher light transmittance. Accordingly, apart corresponding to the first electrodes 903-5 to 903-8 forms an opening. However, the voltage is not applied between adjacent first electrodes 903 in the barrier unit 90 in the normally white mode. Therefore, light escapes from portions corresponding to between electrodes even in portions above the first electrodes 903-1 to 903-4, the first electrode 903-9 and the first electrode 903-10 which are portions desired to be sealed.

Also in State 2 in FIG. 15, a voltage to be applied to the first electrodes 903-1, the first electrode 903-2 and the first electrodes 903-7 to 903-10 is 5V, and a voltage to be applied to the first electrodes 903-3 to 903-6 is 0V. In this case, the liquid crystal layer 909 above the first electrodes 903-1, the first electrode 903-2 and the first electrodes 903-7 to 903-10 is in the alignment state with lower light transmittance, and the liquid crystal layer above the first electrodes 903-3 to 903-6 is in the alignment state with higher light transmittance. Accordingly, a part corresponding to the first electrodes 903-3 to 903-6 forms an opening. However, the voltage is not applied between adjacent first electrodes 903 in the barrier unit 90 in the normally white mode also in this case. Therefore, light escapes from portions corresponding to between electrodes even in portions above the first electrodes 903-1, the first electrode 903-2 and the first electrodes 903-7 to 903-10 which are portions desired to be sealed.

Accordingly, in the barrier unit 10 according to the embodiment of the present disclosure, adjacent first electrodes 103 are arranged so as to partially overlap each other through the insulating layer. The voltage is applied also between adjacent electrodes due to the above structure, therefore, light escape between electrodes can be reduced.

In FIG. 3, the first electrodes 103 are formed separately in a first layer in which the first electrode 103-1, the first electrode 103-3, the first electrode 103-5, the first electrode 103-7 and the first electrode 103-9 are formed and in a second layer in which the first electrode 103-2, the first electrode 103-4, the first electrode 103-6, the first electrode 103-8 and the first electrode 103-10 are formed. The insulating layer 104 is interposed between the first layer and the liquid crystal layer 109. However, any other layer is not interposed between the first electrodes 103 in the second layer and the liquid crystal layer 109. Therefore, when a voltage of the same value is applied to the first electrodes 103 formed in the first layer and the first electrodes 103 formed in the second layer, a voltage value applied to the liquid crystal layer 109 is reduced for an amount corresponding to the interposition of the insulating layer. It is thus preferable that a voltage of a higher value is applied to the first electrodes 103 formed in the first layer than the first electrodes 103 formed in the second layer.

The present disclosure can be applied to not only the barrier device in the normally white mode but also the barrier device in the normally black mode. A barrier unit 10b in the normally black mode is shown in FIG. 4. As shown in State 1 of FIG. 4, when a voltage to be applied to the first electrodes 103-1 to 103-4, the first electrode 103-9 and the first electrode 103-10 is 0V, and a voltage to be applied to the first electrodes 103-5 to 103-8 is 5V, the liquid crystal layer 109 above the first electrodes 103-1 to 103-4, the first electrode 103-9 and the first electrode 103-10 is in the alignment state with lower light transmittance, and the liquid crystal layer 109 above the first electrodes 103-5 to 103-8 is in the alignment state with higher light transmittance. Accordingly, a part corresponding to the first electrodes 103-5 to 103-8 forms an opening.

Also in State 2 in FIG. 4, a voltage to be applied to the first electrode 103-1, the first electrode 103-2 and the first electrodes 103-7 to 103-10 is 0V, and a voltage to be applied to the first electrodes 103-3 to 103-6 is 5V. In this case, the liquid crystal layer 109 above the first electrode 103-1, the first electrode 103-2 and the first electrodes 103-7 to 103-10 is in the alignment state with lower light transmittance, and the liquid crystal layer 109 above the first electrodes 103-3 to 103-6 is in the alignment state with higher light transmittance. Accordingly, a part corresponding to the first electrodes 103-3 to 103-6 forms an opening. In this case, the first electrodes 103 are arranged so that adjacent first electrodes 103 vertically overlap each other. As the voltage is applied between electrodes, light escape between electrodes can be prevented.

In above FIG. 3 and FIG. 4, the entire surface of the first electrode 103 in the first layer is covered with the insulating layer 104 seen from the liquid crystal layer 109. In response to this, a modification example of the structure of the first electrodes 103 is shown in FIG. 5. As all the first electrodes 103 face the liquid crystal layer 109 due to the structure, an advantage that electric fields to be applied to the liquid crystal layer 109 will be uniform can be obtained.

The voltage applied to the first electrodes 103 in the barrier unit 10 is controlled so that the openings track a viewpoint position based on the viewpoint position recognized by an analysis result of an image including the observer. With this configuration, the display apparatus 1000 can function as a so-called head tracking type stereoscopic display apparatus.

3. Peripheral Wiring Example

Figure 8A:
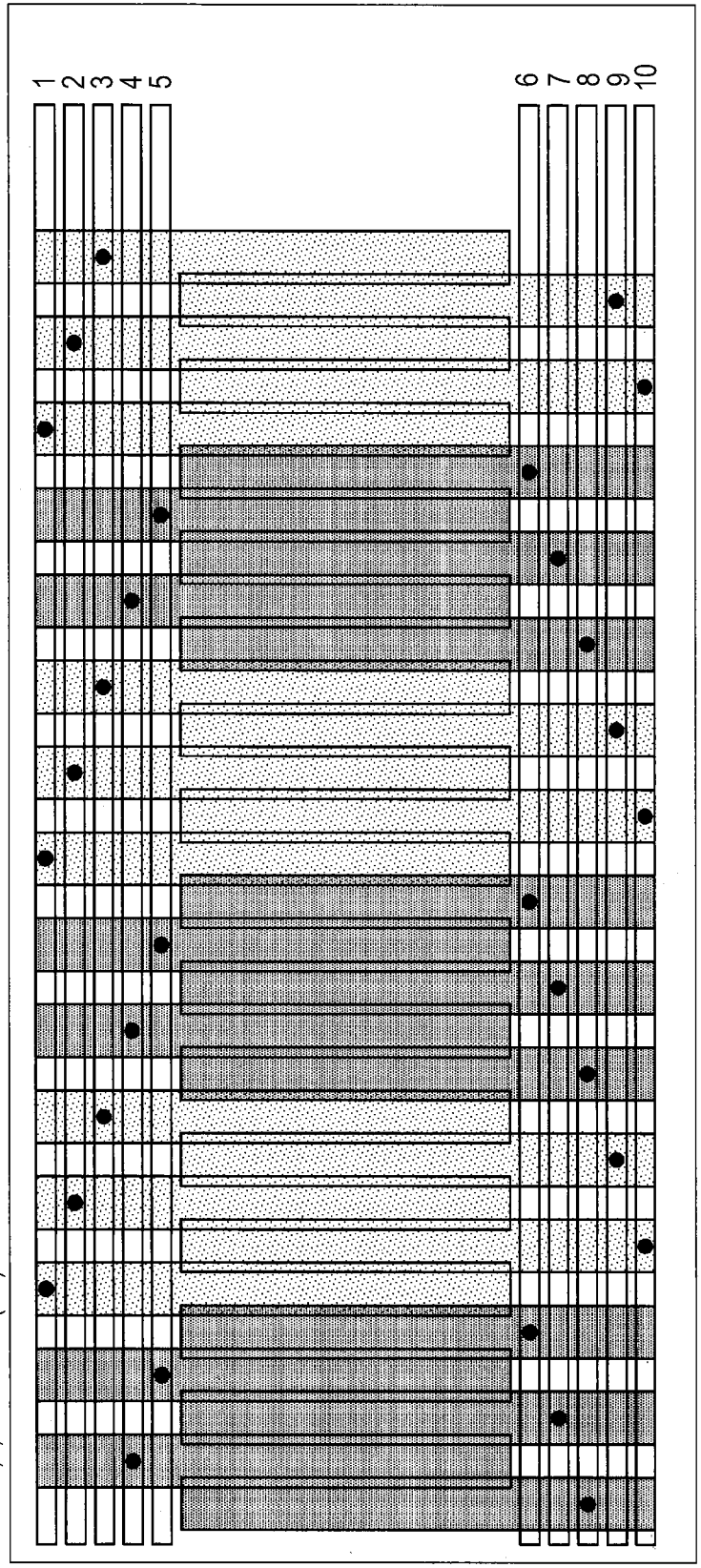
FIG. 8A is an upper surface views showing an example of a three-layer structure of peripheral wiring in the barrier unit according to the embodiment.

A peripheral wiring example for controlling the voltage to be applied to the first electrodes 103 in the barrier unit 10 according to the embodiment of the present disclosure will be explained with reference to FIGS. 6A, 6B to FIG. 9. FIGS. 6A and 6B are upper surface views showing an example of a five-layer structure of peripheral wiring in the barrier unit according to the embodiment. FIG. 7 is a perspective view showing the example of the five-layer structure of peripheral wiring in the barrier unit according to embodiment. FIGS. 8A and 8B are upper surface views showing an example of a three-layer structure of peripheral wiring in the barrier unit according to the embodiment. FIG. 9 is a perspective view showing an example of the three-layer structure of peripheral wiring in the barrier unit according to embodiment.

First, referring to FIG. 6A, ten wiring lines and electrodes are arranged orthogonal to each other. Then, contacts are provided between wiring lines and electrodes. According to the structure, for example, when the voltage of 5V is applied to a wiring line 1, the voltage is applied to electrodes having contacts with the wiring line 1. For example, FIG. 6A shows State 1 in which the voltage of 5V is applied to wiring lines 1 to 5. In this case, the voltage of 5V is applied to electrodes having contacts with the wiring lines 1 to 5. In State 2 shown in FIG. 6B, the voltage of 5V is applied to wiring lines 3 to 7. In this case, the voltage of 5V is applied to electrodes having contacts with the wiring lines 3 to 7. The wiring lines to which the voltage is applied are selected in the above manner, thereby selecting electrodes to which the voltage is applied and controlling positions of the openings.

FIG. 7 is a perspective view showing the stacked structure of the above peripheral wiring. In the barrier unit 10, the first electrodes 103 are provided in two layers. The first electrodes 103 provided in one layer are referred to as transparent electrodes α here. The first electrodes 103 provided in the other layer are referred to as transparent electrodes β here. In this case, the five-layer structure in which a wiring layer, an insulating film, a transparent electrode α, an insulating film and a transparent electrode β are sequentially stacked. In this case, the transparent electrodes α and the transparent electrodes β are alternately provided so as to partially overlap one another.

Next, referring to FIG. 8A, a peripheral wiring example of the three-layer structure is shown. Transparent electrodes are used as wiring in this case. Accordingly, contacts are made from both sides of the panel. For example, in State 1 shown in FIG. 8A, the voltage of 5V is applied to electrodes 1 to 3, 9 and 10 in the electrodes 1 to 10 arranged in the horizontal direction. In this case, the voltage of 5V is applied to electrodes having contacts with the electrodes 1 to 3, 9 and 10 in electrodes arranged in the vertical direction. The electrodes arranged in the vertical direction in this case are alternately provided in different layers. The electrodes not having contacts with the electrodes 1 to 5 in the horizontal direction are provided in the same layer as the electrodes 1 to 5. The electrodes in the vertical direction having contacts with the electrodes 1 to 5 in the horizontal direction are provided in the same layer as the electrodes 6 to 10. The peripheral wiring example has the three-layer structure including the layer in which an insulating film is provided. In State 2 shown in FIG. 8B, the voltage of 5V is applied to electrodes 2 to 4, 8 and 9 in electrodes 1 to 10 arranged in the horizontal direction. In this case, the voltage of 5V is applied to electrodes having contacts with the electrodes 2 to 4, 8 and 9 in electrodes arranged in the vertical direction.

FIG. 9 is a perspective view showing a stacked structure of the above peripheral wiring. In the barrier unit 10, the first electrodes 103 are provided in two layers. The first electrodes 103 provided in one layer are referred to as transparent electrodes α here. The first electrodes 103 provided in the other layer are referred to as transparent electrodes β here. The transparent electrodes α and transparent electrodes β are used also as wiring. The transparent electrodes α and transparent electrodes β are alternately provided so as to partially overlap one another in a portion where the transmissive portions and the blocking portions are formed in the barrier unit 10.

4. Example of Advantages

Figure 10:
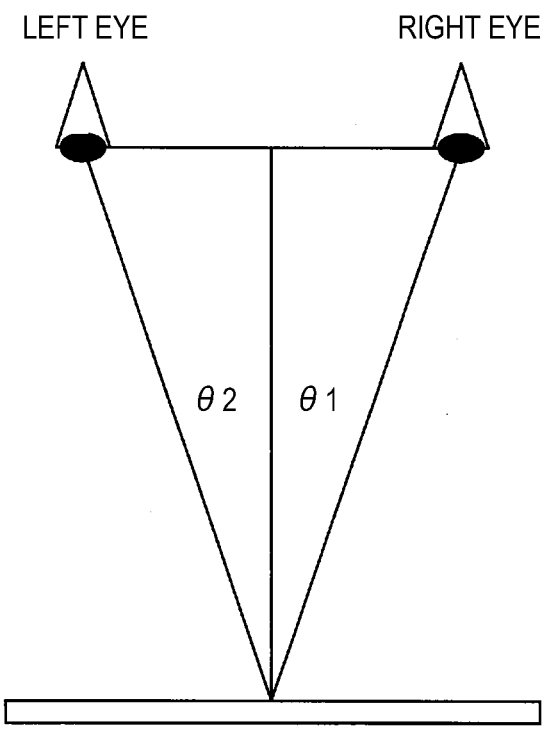
FIG. 10 is an explanatory view for explaining advantages of the display apparatus according to the embodiment.
Figure 11:
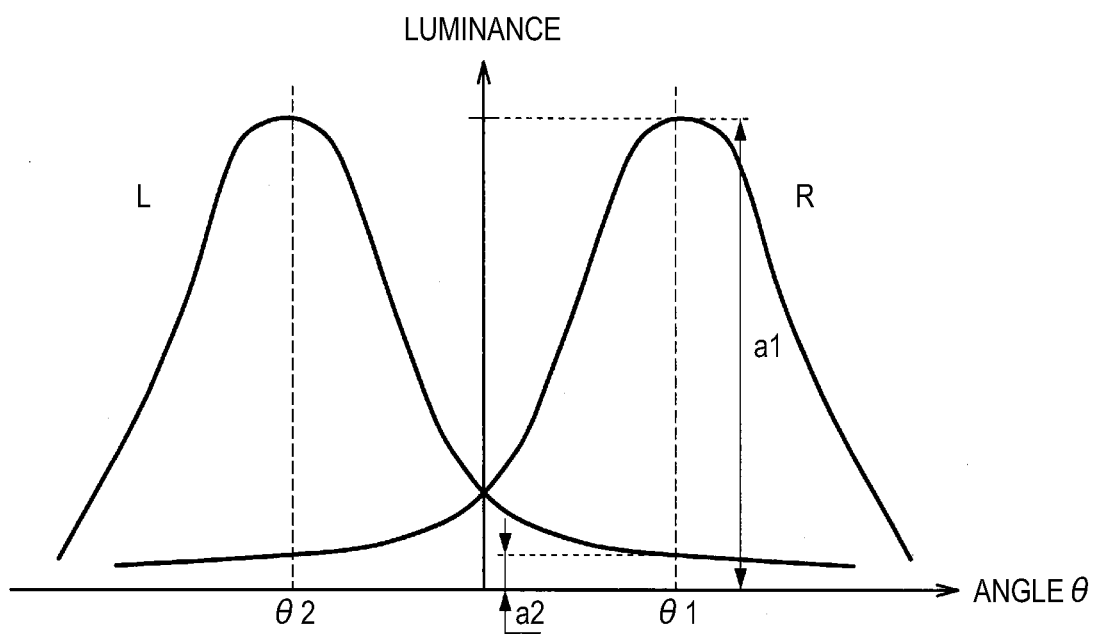
FIG. 11 is an explanatory view for explaining advantages of the display apparatus according to the embodiment.
Figure 12:
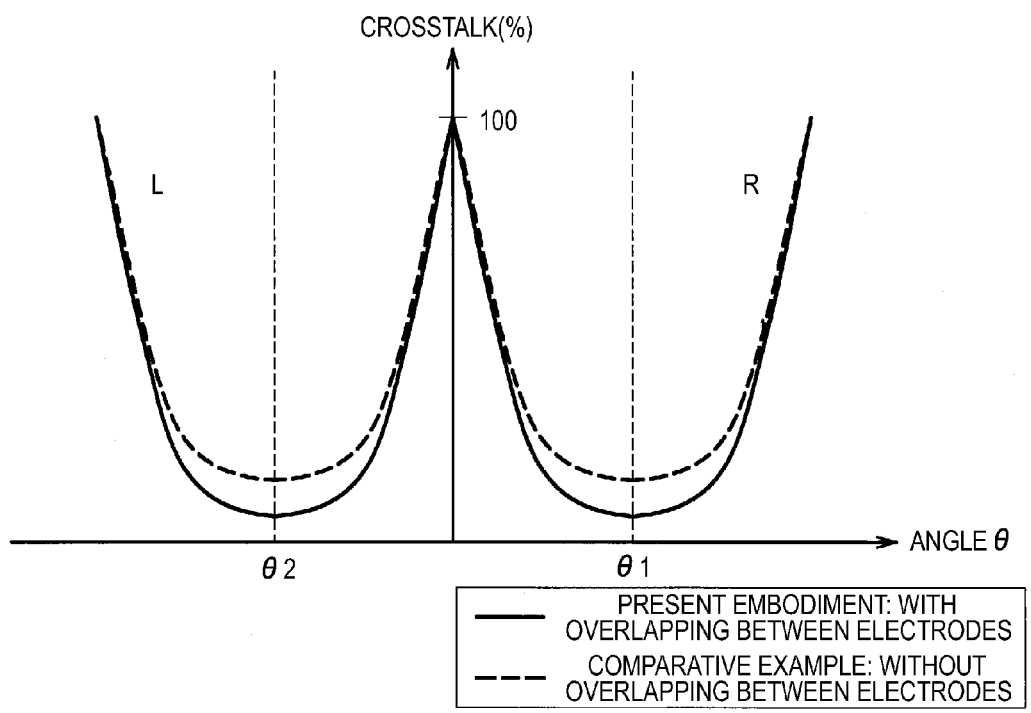
FIG. 12 is a graph showing the relation between angles and crosstalk indicating advantages of the display apparatus according to the embodiment.
Figure 13:
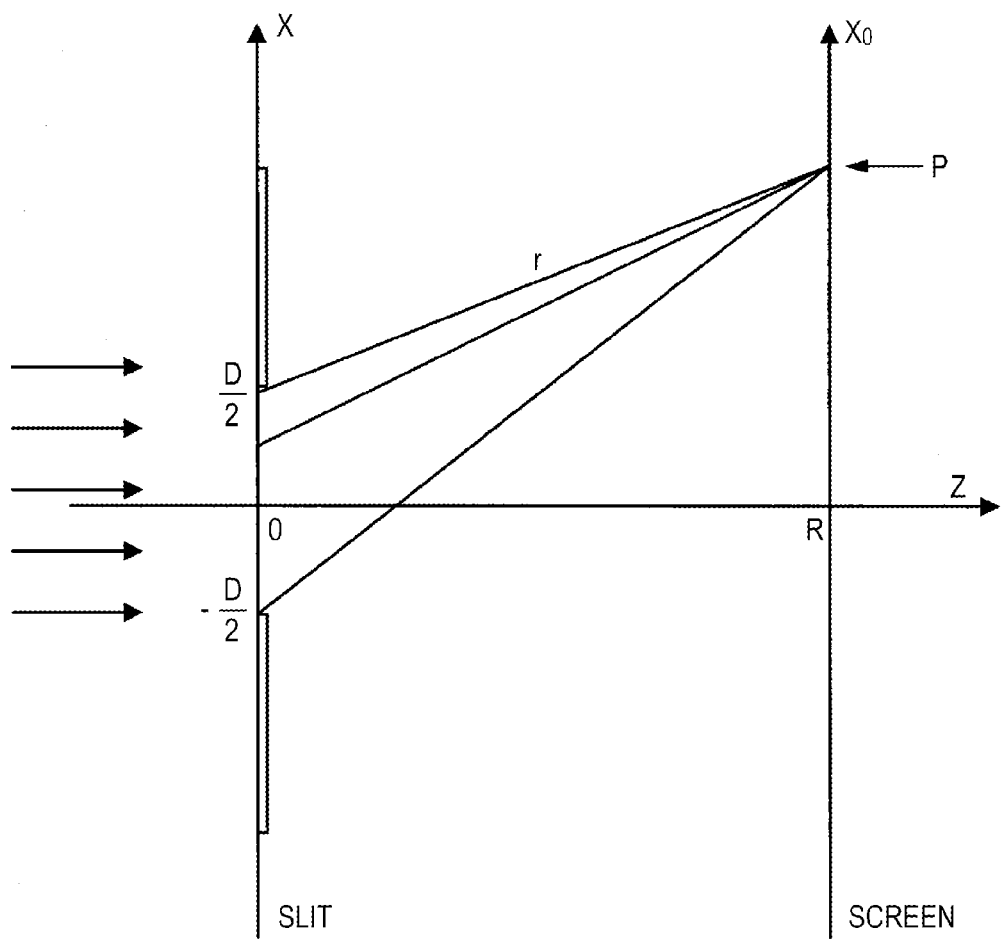
FIG. 13 is an explanatory view explaining respective parameters for calculating Fraunhofer diffraction in the display apparatus according to the embodiment.
Figure 14:
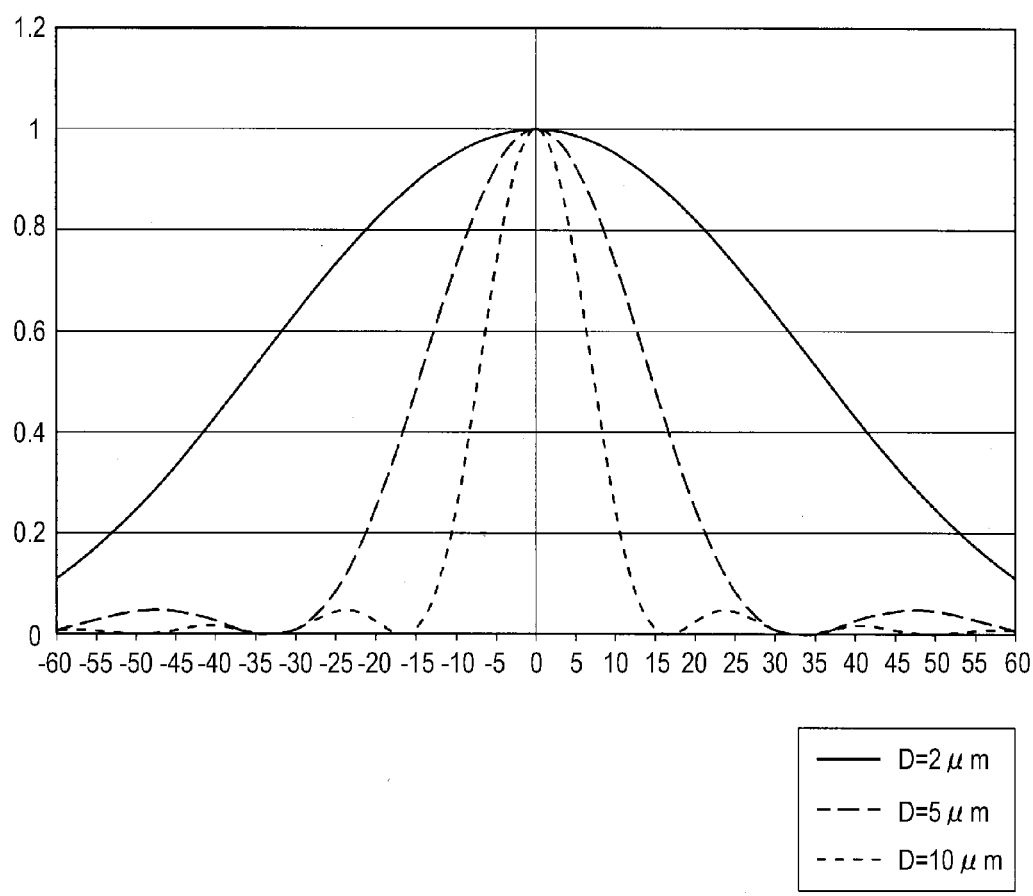
FIG. 14 is a graph obtained by normalizing values of Fraunhofer diffraction calculated in the display apparatus according to the embodiment.

Here, an example of advantages of the display apparatus 1000 according to the embodiment of the present disclosure will be explained with reference to FIG. 10 to FIG. 14. FIG. 10 is an explanatory view for explaining advantages of the display apparatus according to the embodiment. FIG. 11 is an explanatory view for explaining advantages of the display apparatus according to the embodiment. FIG. 12 is a graph showing the relation between angles and crosstalk indicating advantages of the display apparatus according to the embodiment. FIG. 13 is an explanatory view explaining respective parameters for calculating Fraunhofer diffraction in the display apparatus according to the embodiment. FIG. 14 is a graph obtained by normalizing values of Fraunhofer diffraction calculated in the display apparatus according to the embodiment.

As shown in FIG. 10, an angle made by a perpendicular line drawn from the center between the right eye and the left eye to a screen and a line connecting a contact point between the perpendicular line and the screen to the right eye is set to $\theta_1$. An angle made by a line connecting the contact point to the left eye and the perpendicular line is set to $\theta_2$.

In this case, the luminance of image light from the display apparatus 1000 reaches peaks when the angle $\theta$ is $\theta_1$ and $\theta_2$ as shown in FIG. 11. Here, crosstalk is shown by the proportion between a luminance a1 of a light "R" which should be reach the right eye and a luminance a2 of a light L which should be reach the left eye. For example, when the angle $\theta$ is a positive value, the cross talk is represented by a2/a1. When the angle θ is a negative value, the cross talk is represented by a1/a2. Values of crosstalk are shown in FIG. 12. In this case, crosstalk occurring when overlapping between electrodes is provided in the display apparatus according to the embodiment and crosstalk occurring when the overlapping is not provided as a comparative example are shown. Referring to FIG. 12, the crosstalk is improved in the display apparatus according to the embodiment as compared with the display apparatus according to the comparative example.

As shown in FIG. 13, Fraunhofer diffraction at a point "P" on the screen is calculated by setting a gap between electrodes to "D", a distance to the screen to "R" and a wavelength of light to "λ". Values obtained by normalizing values calculated as the above are shown in FIG. 14. When there are gaps between electrodes, electric fields with amplitudes shown here are generated on the screen. Such unnecessary light can be reduced by applying the present embodiment.

The preferred embodiment of the present disclosure has been explained in detail as the above with reference to the attached drawings, however, the technical range of the present disclosure is not limited to the above example. It is obvious that various modifications or alterations may occur to those skilled in the art of the present disclosure within the scope of technical ideas described in the appended claims, which naturally belong to a technical range of the present disclosure.

In the drawings and the above explanation, points necessary for understanding the technical contents of the present disclosure are chiefly shown. Accordingly, not all the structures are shown in the drawings. Structures other than the structures shown in the drawings may be included. Additionally, the thickness or the size of components shown in the drawings is not necessarily drawn with precise proportion.

Furthermore, the display apparatus using the liquid crystal barrier is the 3D display apparatus in the above embodiment, however, the application range of the present disclosure is not limited to the example. For example, the display apparatus using the liquid crystal barrier is not limited to the 3D display apparatus and may be applied to all display apparatuses separating the image into plural viewpoint images to be provided. The 3D display apparatus provides two images respectively to the right and left eyes of one observer to thereby allow the observer to recognize the images as a 3D image. The divided images may be provided to plural observers. According to the above display apparatus, different images can be respectively provided to plural observers. This kind of display apparatus may be applied to a navigation apparatus. The navigation apparatus can provide different images respectively to an observer sitting in a driver's seat and an observer sitting in a passenger's seat.

The following configurations also belong to the technical range of the present disclosure.

(1) A display apparatus including
a display unit, and
a liquid crystal variable barrier arranged so as to face the display unit, having plural strip-shaped first electrodes, a second electrode arranged so as to face the first electrodes and a liquid crystal layer arranged between the first electrodes and the second electrode, and separating an image displayed by the display unit into images respectively corresponding to plural viewpoints,
in which the first electrodes are arranged so that adjacent first electrodes partially overlap each other through an insulating layer, and plural first electrodes form an opening.

(2) The display apparatus described in the above (1),
in which the plural first electrodes are formed alternately in a first layer and a second layer,
a distance between the first layer and the liquid crystal layer is larger than a distance between the second layer and the liquid crystal layer, and
a voltage to be applied to the first electrodes formed in the first layer is larger than a voltage to be applied to the first electrodes formed in the second layer.

(3) The display apparatus described in the above (1) or (2),
in which positions of the openings track a viewpoint position by controlling the voltage to be applied to the first electrodes based on the viewpoint position recognized from an analysis result of an image including an observer.

(4) A liquid crystal variable barrier including
plural strip-shaped first electrodes,
a second electrode arranged so as to face the first electrodes, and
a liquid crystal layer arranged between the first electrodes and the second electrode,
in which the first electrodes are arranged so that adjacent first electrodes partially overlap each other through an insulating layer, and plural first electrodes form an opening.

The present disclosure contains subject matter related to that disclosed in Japanese Priority Patent Application JP 2012-046794 filed in the Japan Patent Office on Mar. 2, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display apparatus comprising:
a display unit; and
a liquid crystal variable barrier arranged so as to face the display unit, having
a first substrate,
a second substrate opposed to the first substrate,
a plurality of first electrodes on the first substrate, each of which has a strip shape, the first electrodes including first-upper electrodes and first-lower electrodes,
a second electrode that is disposed on the second substrate and arranged so as to face the first electrodes, and
a liquid crystal layer arranged between the first electrodes and the second electrode, the liquid crystal variable barrier separating an image displayed by the display unit into images respectively corresponding to a plurality of viewpoints,
wherein the first-lower electrodes are disposed on the first substrate, and the first-upper electrodes are disposed on the first-lower electrodes through an insulating layer,
wherein the first-upper electrodes and the first-lower electrodes are arranged alternatively to partially overlap each other through the insulating layer,
wherein the first electrodes form an opening area having high light transmittance in the liquid crystal layer, and
wherein the insulating layer partially covers the first-lower electrodes to expose the first-lower electrodes to the liquid crystal layer.

2. The display apparatus according to claim 1,
wherein the opening area is one of a plurality of opening areas and positions of the opening areas track a viewpoint position by controlling the voltage to be applied to the first electrodes based on the viewpoint position recognized from an analysis result of an image including an observer.

3. A liquid crystal variable barrier comprising:
a first substrate;
a second substrate opposed to the first substrate;
a plurality of first electrodes on the first substrate, each of which has a strip shape, the first electrodes including first-upper electrodes and first-lower electrodes;
a second electrode that is disposed on the second substrate and arranged so as to face the first electrodes; and
a liquid crystal layer arranged between the first electrodes and the second electrode,
wherein the first-lower electrodes are disposed on the first substrate, and the first-upper electrodes are disposed on the first-lower electrodes through an insulating layer,
wherein the first-upper electrodes and the first-lower electrodes are arranged alternatively to partially overlap each other through the insulating layer,
wherein the first electrodes form an opening area having high light transmittance in the liquid crystal layer, and
wherein the insulating layer partially covers the first-lower electrodes to expose the first-lower electrodes to the liquid crystal layer.

* * * * *